United States Patent
Huang et al.

(10) Patent No.: US 8,362,120 B2
(45) Date of Patent: Jan. 29, 2013

(54) STRUCTURAL ADHESIVES CONTAINING MALEIMIDE TERMINATED POLYIMIDES

(75) Inventors: Jian-Ping Huang, Cary, NC (US); Eric N. Wyman, Holly Springs, NC (US)

(73) Assignee: Lord Corporation, Cary, NC (US)

( * ) Notice: Subject to any disclaimer, the term of this patent is extended or adjusted under 35 U.S.C. 154(b) by 204 days.

(21) Appl. No.: 12/698,511

(22) Filed: Feb. 2, 2010

(65) Prior Publication Data

US 2010/0218892 A1  Sep. 2, 2010

Related U.S. Application Data

(60) Provisional application No. 61/149,108, filed on Feb. 2, 2009.

(51) Int. Cl.
*C08K 5/521* (2006.01)

(52) U.S. Cl. ........ 524/140; 524/397; 524/399; 524/456; 524/492; 524/493

(58) Field of Classification Search .................. 524/140, 524/397, 399, 456, 492, 493
See application file for complete search history.

(56) References Cited

U.S. PATENT DOCUMENTS

| | | |
|---|---|---|
| 3,554,944 A | 1/1971 | Schering Ag |
| 3,717,615 A | 2/1973 | Holub et al. |
| 4,085,164 A | 4/1978 | Gruffaz et al. |
| 4,743,647 A | 5/1988 | Domeier |
| 5,003,018 A | 3/1991 | Repecka |
| 5,087,681 A | 2/1992 | Kinloch et al. |
| 5,096,766 A | 3/1992 | Chu et al. |
| 5,165,977 A | 11/1992 | Dynes et al. |
| 5,393,887 A | 2/1995 | Petit |
| 5,462,996 A | 10/1995 | Portelli et al. |
| 5,503,940 A | 4/1996 | Majumdar et al. |
| 5,554,769 A | 9/1996 | Sheppard et al. |
| 5,741,393 A | 4/1998 | Hargis et al. |
| 5,973,166 A | 10/1999 | Mizori et al. |
| 6,034,194 A | 3/2000 | Dershem et al. |
| 6,039,896 A | 3/2000 | Miyamoto et al. |
| 6,096,900 A | 8/2000 | Nick et al. |
| 6,806,309 B2 | 10/2004 | Jaeger |
| 6,825,315 B2 | 11/2004 | Aubert |
| 7,157,587 B2 | 1/2007 | Mizori et al. |
| 7,176,044 B2 | 2/2007 | Forray et al. |
| 7,208,566 B2 | 4/2007 | Mizori et al. |
| 7,256,238 B2 | 8/2007 | Kubo et al. |
| 7,291,677 B2 | 11/2007 | Cai et al. |
| 7,312,534 B2 | 12/2007 | Delos Santos et al. |
| 2004/0006196 A1 | 1/2004 | Scola et al. |
| 2004/0225059 A1 | 11/2004 | Mizori et al. |
| 2005/0131154 A1 | 6/2005 | Cai et al. |
| 2008/0020157 A1 * | 1/2008 | Larson et al. ................. 428/35.5 |
| 2008/0075961 A1 | 3/2008 | Mizori |
| 2008/0262191 A1 | 10/2008 | Mizori |
| 2009/0087591 A1 * | 4/2009 | Larson et al. .................. 428/1.5 |

FOREIGN PATENT DOCUMENTS

| | | |
|---|---|---|
| DE | 4218311 A1 | 12/1992 |
| EP | 30238 A1 | 12/1980 |
| EP | 0348222 A1 | 12/1989 |
| JP | 63248828 A | 10/1988 |
| JP | 1045430 A | 2/1989 |
| JP | 2229157 A | 9/1990 |
| JP | 3131628 A | 6/1991 |
| JP | 4004281 A | 1/1992 |
| JP | 4295463 A | 10/1992 |
| JP | 8060132 A | 3/1996 |
| JP | 10175952 A | 6/1998 |
| JP | 11-035903 | 2/1999 |
| JP | 2002053818 A | 2/2002 |
| JP | 2003292930 A | 10/2003 |
| JP | 2003321608 A | 11/2003 |
| JP | 2005226059 A | 8/2005 |
| WO | 80/02700 | 12/1980 |
| WO | 94/25451 | 11/1994 |
| WO | 2008/011452 A1 | 1/2008 |

OTHER PUBLICATIONS

Journal Abstracts, 4 pages.

* cited by examiner

*Primary Examiner* — Peter Szekely
(74) *Attorney, Agent, or Firm* — Todd W. Galinski

(57) ABSTRACT

A maleimide terminated polyimide incorporated into a two-part acrylic structural adhesive system. The maleimide terminated polyimide of the various embodiments of the present invention provide improving thermal stability, strength, and toughness.

20 Claims, No Drawings

STRUCTURAL ADHESIVES CONTAINING MALEIMIDE TERMINATED POLYIMIDES

CROSS REFERENCE TO RELATED APPLICATIONS

This application claims priority to U.S. Provisional Application No. 61/149,108, for "STRUCTURAL ADHESIVES CONTAINING IMIDE-EXTENDED MALEIMIDE", filed Feb. 2, 2009, and which is herein incorporated by reference in its entirety.

FIELD OF THE INVENTION

The present invention relates to structural adhesive compositions. More particularly, the invention relates to structural adhesives having improved strength and toughness.

BACKGROUND OF THE INVENTION

Acrylic structural adhesive compositions are well-known articles of commerce which are extensively used commercially for bonding metal and plastic materials. The load-bearing and stress-relieving properties of structural adhesives, as well as their bond strength, which can exceed the strength of the materials which are being bonded, make these adhesives attractive alternatives to or partial replacements for mechanical methods, such as riveting or spot welding, of joining materials, especially where it is preferable to distribute load stresses over larger areas rather than to concentrate such stresses at a few points. Their use can reduce or eliminate costly finishing operations necessitated by mechanical joining methods, present a more pleasing exterior and at least reduce the possibility of corrosion of assemblies containing one or more metal components. Additionally, they can be used to bond a diversity of metals without extensive surface preparation.

Acrylic structural adhesives are extensively used for providing structural strength-imparting bonds to joined metal and or polymer materials. Acrylic structural adhesives are useful for bonding of metal parts in place of welding or mechanical fastening techniques. The structural requirements include high bond strength and good failure mode. A typical method to measure bond strength is the lap shear, high speed impact, and T-peel tests. One prevalent use for acrylic structural adhesives is in forming hem flanges in automotive body panels and doors. Exemplary conventional acrylic structural adhesives and methods for using acrylic structural adhesives are disclosed in the following U.S. patents: U.S. Pat. No. 6,180,199 entitled Beaded Adhesive And Hem Flanged Part Made Therefrom; U.S. Pat. No. 6,074,506 entitled Method Of Bonding Using Non-Compressible Beads; U.S. Pat. No. 5,932,638 entitled Free, Radical Polymerizable Compositions Including Para-Halogenated Aniline Derivatives; U.S. Pat. No. 5,783,298 entitled Adhesive Mixture With Non-Compressible Beads Therein U.S. Pat. No. 5,710,235 entitled Olefinic And Urethane-Terminated Ester Polyalkadiene; U.S. Pat. No. 5,641,834 entitled Modified Polyalkadiene-Containing Compositions; and U.S. Pat. No. 5,632,413 entitled Adhesive Bonding Apparatus And Method Using Non-Compressible Beads. Conventional acrylic structural adhesives typically comprise a mixture of one or more olefinic reactive monomers such as methyl methacrylate and methacrylic acid, toughener(s) and redox initiator system. The toughener(s), which may or may not be reactive, or polymerizable with the reactive monomers. Reactive polymers such as unsaturated polyesters and acrylourethane prepolymers may be used to graft onto or crosslink the initiated monomers during polymerization. In addition, fully formulated acrylic structural adhesives typically contain other additives for improving adhesion to substrate materials, environmental resistance, impact strength, flexibility, heat resistance, and the like. Epoxy resins impart improved heat resistance.

Unfortunately, with many prior art structural adhesives there is a trade-off between flexibility/toughness and strength. In order to increase flexibility and toughness rubbery polymers are added to the adhesive, however the addition of these rubbery polymers negatively impacts the modulus and ultimately the strength of the adhesive. It would therefore be desirable to provide a structural adhesive formulation with increased flexibility and toughness without sacrificing strength.

It is to these needs that the present invention is directed.

SUMMARY OF THE INVENTION

In a first aspect of the present invention, a structural adhesive is provided comprising a free radical-polymerizeable monomer, and a maleimide terminated polyimide wherein the maleimide comprises a mono-, bis-, or poly-maleimide compound. In one embodiment of the present invention, the radical-polymerizable monomer comprises tetrahydrofurfuryl methacrylate (THFMA). In another embodiment of the present invention, the adhesive further comprises a toughener, preferably comprising at least one of glycidyl methacrylate/carboxyl terminated butadiene (GMA/CTB) adducts, core-shell impact modifiers, and block copolymer elastomers.

In an additional embodiment of the present invention, the adhesive further comprises an adhesion promoter, preferably hydroxyetlaviniethacrviate phosphate (HEMA phosphate). In yet another embodiment of the present invention, the adhesive further comprises a metal dimethacrylate, preferably zinc dimethacrylate. In a further embodiment of the present invention, the adhesive further comprises ethoxylated bisphenol A dimethacrylate. And in another embodiment of the present invention, the adhesive further comprises a particulate additive comprising at least one of calcium metasilicate or fumed silica.

In an additional aspect of the present invention, a two part structural adhesive composition is provided comprising in part A: (a) at least one free radical-polymerizable monomer; (b) a maleimide terminated polyimide; and (c) a reducing agent, and in part B: an oxidizing agent. In a preferred embodiment of the present invention, the reducing agent comprises at least one of N,N-diisopropanol-p-chloroaniline; N,N-diisopropanol-p-bromoaniline; N,N-diisopropanol-p-bromo-m-methylaniline; N,N-dimethyl-p-chloroaniline; N,N-dimethyl-p-bromoaniline; N,N-diethyl-p-chloroaniline; N,N-diethyl-p-bromoaniline; N,N-dimethyl-p-aniline; and N,N-diisopropanol-p-toluidine. And in another embodiment of the present invention, the oxidizing agent comprises benzoylperoxide. In a preferred embodiment of the present invention, the weight ratio of the first package to the second package is from about 1:1 to about 15:1.

In a further aspect of the present invention, a method for bonding two substrates is provided comprising the steps of providing a structural adhesive composition comprising a maleimide terminated polyimide on a first substrate, and contacting the second substrate to the structural adhesive on the first substrate and curing the structural adhesive. In another embodiment of the present invention, the structural adhesive comprises at least one of an acrylic-based structural adhesive or an epoxy-based structural adhesive.

DETAILED DESCRIPTION OF THE INVENTION

In a first aspect of the present invention, a structural adhesive is provided comprising a maleimide terminated polyimide, preferably a bismaleimide terminated polyimide. The structure of this additive provides improved strength, toughness, and thermal stability to final polymer network.

In a further aspect of this invention, a maleimide terminated polyimide is incorporated into a two-part acrylic adhesive system for improving thermal stability, strength, and toughness. It is believed that the maleimide terminated polyimide of the various embodiments of the present invention provide this balance of physical features through the combination of rigid aromatic sections interspersed with flexible aliphatic chains.

The maleimide terminated polyimide is a unique molecule that possesses both rigid imide segments and flexible dimer-fatty acid chains. When formulated into an acrylic adhesive, it enhances both strength and toughness when maintaining the thermal stability.

The A-side of the two part reactive acrylic structural adhesive contains 10 to 90% by weight of at least one free radical-polymerizable monomer in a major amount (the primary monomer). Representative monomers include esters of (meth)acrylic acid such as methyl methacrylate, ethyl methacrylate, butyl methacrylate, methyl acrylate, butyl acrylate, cyclohexyl acrylate, hexyl acrylate, 2-ethylhexyl acrylate, lauryl acrylate, ethyl acrylate, diethylene glycol dimethacrylate, dicyclopentadienyloxyethyl methacrylate, cyclohexyl methacrylate, lauryl methacrylate, glycidyl methacrylate and tetrahydrofurfuryl methacrylate (THFMA). The preferred monomer(s) contributes rigidity in the cured polymer and is selected from methacrylic esters exhibiting a homopolymer Tg of at least 50° C., preferably 60° C., and some as much as 105° C.

In a further embodiment of the present invention, the primary monomer may be combined with an ethylenic unsaturated carboxylic monomer such as methacrylic acid, acrylic acid, substituted (meth)acrylic acids such as itaconic acid, maleic acid and fumaric acid. Further optional comonomers includable herein are acrylonitrile, methacrylonitrile, acrylamide and methacrylamide; vinyl acetate; vinylidene chloride; and butadienes such as 2,3-dichloro-1,3-butadiene and 2-chloro-1,3-butadiene. Other useful monomers include maleate esters; and fumarate esters. In one embodiment, a mixture of the monomers tetrahydrofurfuryl methacrylate, methacrylic acid and methyl methacrylate is useful. In further embodiments it is optionally preferable to include a reactive diluent with the primary monomer.

Comonomers optionally includable with the primary monomer include OH-functional monoethylenic unsaturated monomers like 2-hydroxyethyl(meth)acrylate, 3-hydroxypropyl (meth)acrylate, 4-hydroxybutyl (meth)acrylate, 4-hydroxycyclohexyl(meth)acrylate, 1,6-hexanediol mono(meth)acrylate, neopentyl glycol mono(meth)acrylate, 1,6-hexanediol dimethacrylate, and 1,4-butanediol dimethacrylate. Preferredly from 0.0 to 10 wt % (on wt. of A-side) of a multifunctional crosslinking comonomer is included, such as trimethylohpropane di(meth)acrylate, trimethylolethane di(meth)acrylate, pentaerythritol tri(meth)acrylate, dipentaerythritol penta(meth)acrylate, and epoxy-diacrylates, such as ethoxylated Bisphenol A dimethacrylate.

The maleimide terminated polyimide employed in the present invention comprises any maleimide terminated polyimide. In one embodiment of the present invention, the maleimide portion(s) comprise mono-, bis-, or poly-maleimide. In a preferred embodiment of the present invention, the maleimide terminated polyimide comprises those disclosed in U.S. Pat. Nos. 7,157,587 and 7,208,566 herein incorporated by reference in full.

In one embodiment of the present invention, the molecular weight (average molecular weight) of the maleimide terminated polyimide is at least 2,000. In a preferred embodiment of the present invention, the molecular weight is at least about 3,000. In a most preferred embodiment of the present invention, the molecular weight is less than about 10,000, and most preferably less than about 5,000.

In a further embodiment of the present invention, the maleimide terminated polyimide is present in the A side of the adhesive in an amount from about 5 to about 30 weight percent, and more preferably from about 10 to about 20 weight percent.

In a further embodiment of the present invention, the adhesive further comprises an epoxy compound. The epoxy compound of embodiments of the present invention comprises any material that contains an epoxy (oxirane) group. Included epoxy resins are epoxy cresol novolacs, epoxy phenol novolacs and blends of either of these with bisphenol A epoxy resins. Monomeric epoxy compounds and epoxides of the polymeric type can be aliphatic, cycloaliphatic, aromatic or heterocyclic. The "average" number of epoxy groups per molecule is determined by dividing the total number of epoxy groups in the epoxy-containing material by the total number of epoxy molecules present. Useful epoxy materials generally contain on the average at least 1.5 polymerizable epoxy groups per molecule. Preferably two or more epoxy groups per molecule are present. The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The epoxides may be pure compounds but are generally mixtures containing one, two, or more epoxy groups per molecule.

The epoxy-containing materials may vary from low molecular weight monomeric materials to high molecular weight polymers, and may vary greatly in the nature of their backbone and substituent groups. For example, the backbone may be of any type, and substituent groups thereon may be free of an active hydrogen atom. Illustrative of permissible substituents groups include halogens, ester groups, ethers, sulfonate groups, siloxane groups, nitro groups, phosphate groups, etc. The molecular weight of the epoxy-containing materials may vary from about 50 to 100,000 or more. Mixtures of various epoxy-containing materials can also be used in the compositions of this invention.

The epoxy compounds of the present invention can be cycloaliphatic epoxides. Examples of cycloaliphatic epoxides include diepoxides of cycloaliphatic esters of dicarboxylic acids such as bis(3,4-epoxycyclohexylmethyl)oxalate, bis(3,4-epoxycyclohexylmethyl)adipate, bis(3,4-epoxy-6-methylcyclohexylmethyl)adipate, bis(3,4-epoxycyclohexylmethyl)pimelate, and the like. Other suitable diepoxides of cycloaliphatic esters of dicarboxylic acids are described in, for example, U.S. Pat. No. 2,750,395, which is incorporated herein by reference.

Other cycloaliphatic epoxides include 3,4-epoxycyclohexylmethyl-3,4-epoxycyclohexane carboxylates such as 3,4-epoxycyclohexylmethyl-3,4-epoxycyclohexane carboxylate; 3,4-epoxy-1-methylcyclohexylmethyl-3,4-epoxy-1-methylcyclohexane carboxylate; 6-methyl-3,4-epoxycyclohexylmethyl-6-methyl-3,4-epoxycyclohexane carboxylate; 3,4-epoxy-2-methylcyclohexylmethyl-3,4-epoxy-2-methylcyclohexane carboxylate; 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate and the like. Other suitable 3,4-epoxycyclohexylmethyl-3,4-epoxycyclohexane carboxylates are described in, for example, U.S. Pat. No. 2,890,194, which is incorporated herein by reference.

Epoxy resins based on bisphenol A, either solids, per se, and capable of dissolution in a carrier, or liquids per se, are preferred as these are relatively inexpensive. There are a myriad of available epoxy materials, collectively referred to as epoxy resins whether resinous or simple compounds. In particular, simple epoxy compounds which are readily available include octadecylene oxide, glycidylmethacrylate, diglycidyl ether of bisphenol A (e.g., those available under the trade designations EPON from Shell Chemical Co., DER, from Dow Chemical Co.), vinylcyclohexene dioxide (e.g., ERL-4206 from Union Carbide Corp.), 3,4-epoxycyclohexylmethyl-3,4-epoxycyclohexane carboxylate (e.g., ERL-4221 from Union Carbide Corp.), 3,4-epoxy-6-methylcyclohexyl-methyl-3,4-epoxy-6-methylcyclohexene carboxylate (e.g., ERL-4201 from Union Carbide Corp.), bis(3,4-epoxy-6-methylcyclohexylmethyl) adipate (e.g. ERL-4289 from Union Carbide Corp.), bis(2,3-epoxycyclopentyl)ether (e.g., ERL-0400 from Union Carbide Corp.), aliphatic epoxy modified with polypropylene glycol (e.g., ERL-4050 and ERL-4052 from Union Carbide Corp.), dipentene dioxide (e.g., ERL-4269 from Union Carbide Corp.), epoxidized polybutadiene (e.g., OXIRON 2001 from FMC Corp.), silicone resin containing epoxy functionality, flame retardant epoxy resins (e.g., DER-580, a brominated bisphenol type epoxy resin available from Dow Chemical Co.), 1,4-butanediol diglycidyl ether of phenolformaldehyde novolak (e.g., DEN-431 and DEN-438 from Dow Chemical Co.), and resorcinol diglycidyl ether.

Still other epoxy-containing materials are copolymers of epoxy (meth)acrylic acid esters, such as glycidylacrylate and glycidylmethacrylate with one or more copolymerizable vinyl compounds. Examples of such copolymers are 1:1 styrene-glycidylmethacrylate, 1:1 methylmethacrylateglycidylacrylate and a 62.5:24:13.5 methylmethacrylate-ethyl acrylateglycidylmethacrylate.

In one embodiment of the present invention, the epoxy is present in the final formulation in an amount from about 2 to about 20 weight percent and preferably from about 3 to about 10 weight percent. In an alternate embodiment of the present invention, the structural adhesive comprises an epoxy-based structural adhesive wherein an epoxy resin is the primary adhesive material such as those described in U.S. Pat. Nos. 4,578,424 and 5,385,990, herein incorporated by reference.

Any known suitable toughener can be utilized in the structural adhesives according to the inventions. The toughener examples include various solid and liquid elastomeric polymeric materials, and in particular liquid olefinic-terminated elastomers as described in U.S. Pat. Nos. 4,223,115; 4,452,944; 4,769,419; 5,641,834 and 5,710,235; and olefinic urethane reaction products of an isocyanate-functional prepolymer and a hydroxy functional monomer, as described in U.S. Pat. Nos. 4,223,115; 4,452,944; 4,467,071 and 4,769,419, the entire disclosure of each which is hereby incorporated by reference.

Preferred urethane modified olefinic-terminated liquid elastomers include those disclosed in U.S. Pat. No. 4,769,419 comprising the reaction product of an olefinic monoepoxide compound with a polycarboxylic homopolymer of conjugated dienes, and most specifically, the glycidyl methacrylate/carboxyl terminated butadiene (GMA/CTB) adduct as described in U.S. Pat. No. 4,769,419, Example 1.

A-B-A triblock block copolymers are useful tougheners. In one example the A block is polystyrene, alpha-methyl styrene, t-butyl styrene, or other ring alkylated styrenes as well as mixtures of some or all of the above and the B block is an elastomeric segment having a Tg of 0° C. or less, such as that derived from a conjugated diene, like butadiene, isobutylene or other olefin, like ethylene-propylene monomer. Commercially available block copolymer tougheners include EUROPRENE® which are available from Enichem Elastomers Americas, Inc. A preferred toughener is based on a terblock polymer of styrene-[isoprene]-styrene, 25-[50]-25, parts by weight. Other high molecular weight tougheners include, for example, block copolymers and random copolymers including but not limited to polyethylene, polypropylene, styrene-butadiene, polychloroprene, ethylene propylene diene monomer (EPDM), chlorinated rubber, butyl rubber, styrene/butadiene/acrylonitrile rubber and chlorosulfonated polyethylene.

Other tougheners include the liquid olefinic-terminated elastomers, wherein the elastomeric moiety is based on homopolymers of butadiene, copolymers of butadiene and at least one monomer copolymerizable therewith, for example, styrene, acrylonitrile, methacrylonitrile (e.g. poly(butadiene-(meth)acrylonitrile or poly(butadiene-(meth)acrylonitrile-styrene) and mixtures thereof; as well as modified elastomeric polymeric materials, such as butadiene homopolymers and copolymers modified by copolymerization therewith of trace amounts of up to about 5 percent by weight of the elastomeric material of at least one functional monomer (such as acrylic acid, methacrylic acid, maleic anhydride, fumaric acid, styrene, and methyl methacrylate to give, for example, methacrylate-terminated polybutadiene homopolymers and/or copolymers.

Inclusive as tougheners are the olefinic-terminated polyalkadienes having carboxy ester linking groups and at least one nascent secondary hydroxyl group, such as disclosed in U.S. Pat. No. 5,587,433, incorporated therein by reference. The secondary OH group may be optionally caped using an isocyanate as is disclosed in commonly owned U.S. Pat. No. 5,641,834, incorporated herein by reference.

Specific examples of adducted hydroxy-terminated polybutadiene (PBD) include the reaction of anhydride modified OH-terminal PBD with dibasic anhydride (phthalic anhydryde), then with an epoxy, such as glycidyl substituents.

A further toughener system utilizes a combination of two polymers having differing molecular weights as is taught in U.S. Pat. No. 6,225,408. A specific example taught therein is combination of a major amount of a primary toughener with a weight average molecular weight (MW) less than about 18,000 together with a minor amount of an auxiliary toughener with a MW greater than about 18,000. A specific example is a 60:40 mixture of glycidyl methacrylate terminated CTBN (carboxyl-terminated acrylonitrile-butadiene) rubber, and a terblock copolymer of styrene-[isoprene]-styrene.

Adhesion promoters useful herein are the known phosphorus-containing compounds with mono-esters of phosphinic, mono- and diesters of phosphonic and phosphoric acids having one unit of vinyl or allylic unsaturation present. Vinylic unsaturation is preferred. Representative of the phoshorus-containing adhesion promoters are, without limitation, phosphoric acid; 2-methacryloyloxyethyl phosphate; bis-(2-methacryloxyloxyethyl)phosphate; 2-acryloyloxyethyl phosphate; bis-(2-acryloyloxyethyl)phosphate; methyl-(2- methacryloyloxyethyl)phosphate; ethyl methacryloyloxyethyl phosphate; methyl acryloyloxyethyl phosphate; ethyl acryloyloxyethyl phosphate; propyl acryloyloxyethyl phosphate, isobutyl acryloyloxyethyl phosphate, ethylhexyl acryloyloxyethyl phosphate, halopropyl acryloyloxyethyl phosphate, haloisobutyl acryloyloxyethyl phosphate or haloethylhexyl acryloyloxyethyl phosphate; vinyl phosphonic acid; cyclohexene-3-phosphonic acid; (α-hydroxybutene-2 phosphonic acid; 1-hydroxy-1-phenylmethane-1,1-diphosphonic acid; 1-hydroxy-1-methyl-1-disphosphonic acid: 1-amino-1-phenyl-1,1-diphosphonic acid; 3-amino-3-hydroxypropane-1,1-disphosphonic acid; amino-tris(methylenephosphonic acid); gamma-amino-propylphosphonic acid; gamma-glycidoxypropylphosphonic acid; phosphoric acid-mono-2-aminoethyl ester; allyl phosphonic acid; allyl phosphinic acid; β-methacryloyloxyethyl phosphinic acid; diallylphosphinic acid; β-methacryloyloxyethyl)phosphinic acid and allyl methacryloyloxyethyl phosphinic acid. A preferred adhesion promoter: is 2-hydroxyethylmethacrylate phosphate.

Another preferred class of adhesion promoters comprises the metal dimethacrylates. One particularly preferred adhesion promoter comprises zinc dimethacrylate. These adhesion promoters serve a dual purpose, metallic interaction with metal surface and crosslinking to strengthen polymer network. In one embodiment of the present invention, the metal dimethacrylate is present from 0.05 to 4.0 weight percent. In a preferred embodiment of the present invention, the metal dimethacrylate is present from about 0.5 to about 2.0 weight percent.

The present invention may also include an ambient temperature initiation system. The ambient temperature initiation systems that may be employed in the preferred adhesive systems are well-known redox couple systems and need not be discussed herein in detail. Basically, such systems comprise at least one oxidizing agent and at least one reducing agent which are co-reactive at room temperature to generate free radicals effective to initiate addition polymerization reactions and cure the adhesive. Substantially any of the known oxidizing and reducing agents which are so co-reactive can be employed. Representative oxidizing agents include, without limitation, organic peroxides, such as benzoyl peroxide and other diacyl peroxides, hydroperoxides such as cumene hydroperoxide, peresters such as β-butylperoxybenzoate; ketone hydroperoxides such as methyl ethyl ketone hydroperoxide, organic salts of transition metals such as cobalt naphthenate, and compounds containing a labile chlorine such as sulfonyl chloride. Representative reducing agents include, without limitation, sulfinic acids; azo compounds such as azoisobutyric acid dinitrile; alpha-aminosulfones such as bis(tolysulfonmethyl)-benzyl amine; tertiary amines such as diisopropanol-p-toluidine (DIIPT), dimethyl aniline, p-halogenated aniline derivatives and dimethyl-p-toluidine; and aminealdehyde condensation products, for example, the condensation products of aliphatic aldehydes such as butyraldehyde with primary amines such as aniline or butylamine. The use of known accelerators and promoters with the redox couple catalyst systems can be advantageous. Preferably, the oxidizing agent will be present in an amount in the range from about 0.5 to about 50 percent by weight of bonding accelerator, with the amount of reducing agent being in the range from about 0.05 to about 10 preferably about 0.1 to about 6.0 percent by weight of polymerizable adhesive composition. DIIPT is the most preferred reducing agent. The most preferred oxidizing agent is benzoyl peroxide.

Although the adhesive of the present invention may take many forms, the most preferred adhesive systems are provided as multipack or two-part adhesive systems where one package or part contains the free radical-polymerizable monomer component and the reducing agent and a second part or package contains the oxidizing agent. The two parts are mixed together at the time of use in order to initiate the reactive cure. After mixing the individual parts, one or both surfaces to be joined are coated with the mixed adhesive system and the surfaces are placed in contact with each other.

Other optional additives which are typically considered in fully formulated adhesives include antioxidants, inhibitors, anti-sag additives, thixotropes, processing aids, waxes, UV stabilizers, arc suppressants, and drip suppressants. Examples of typical additives are fumed silica, alumina, hindered phenols, substituted hydroquinone, silane-treated talc, mica, feldspar, and wollastonite.

Uses

Although the adhesive of the present invention may take many forms, the most preferred adhesive systems are provided as multipack or two-part adhesive systems where one package or part contains the polymerizable or reactive components and the reducing agent and a second package or part contains the oxidizing agent. The two parts are mixed together at the time of use in order to initiate the reactive cure. The preferred means for dispensing the adhesive are two-chambered cartridges equipped with static mixers in the nozzle, and for larger scale application, meter mix dispensing equipment. After mixing the individual packages, one or both surfaces to be joined are coated with the mixed adhesive system and the surfaces are placed in contact with each other. Preferred mix ratios typically include from 1:1 to 10:1 of A:B.

The adhesive systems of the invention may be used to bond metal surfaces, such as steel, aluminum and copper, to a variety of substrates, including metal, plastics, and other polymers, reinforced plastics, fibers, glass, ceramics, wood and the like. The adhesives are particularly useful in hem flange bonding of auto body panels. It is a feature of the present invention that the herein-described adhesive compositions can be employed to bond metal substrates such as steel, aluminum and copper with little, if any, pretreatment of the metal surface prior to application of the adhesive. Thus, bonding can be effected even to oily metal surfaces which are otherwise clean without an extensive pretreatment as is usually required with the vast majority of currently available primers and adhesives. Additionally, the adhesive systems of this invention provide effective bond strength at room temperature, thus heat is not required either for applying the adhesive systems to the substrates or for developing handling strength and dimensional stability.

Although the adhesives of the present invention are preferred for bonding metal surfaces, the present adhesive compositions may be applied as an adhesive, primer or coating to any surface or substrate capable of receiving the adhesive. The metals which are preferred for bonding with the present adhesives include zinc, copper, cadmium, iron, tin, aluminum, silver, chromium, alloys of such metals, and metallic coatings or platings of such metals such as galvanized steel including hot dipped, electrogalvanized steel and galvanealed steel.

The adhesive may be brushed, rolled, sprayed, dotted, knifed, cartridge-applied, especially from a dual cartridge; or otherwise applied to one substrate, but preferably to both substrates to desired thickness preferably not to exceed 60 mils. The substrates may be clamped for firmness during cure in those installations where relative movement of the two substrates might be expected. For example, to adhere metal surfaces, an adherent quantity of the adhesive composition is applied to one surface, preferably to both surfaces, and the surfaces are confronted with the adhesive composition therebetween. The adhesive should have a thickness less than 60 mils for optimum results. The smoothness of the surfaces and their clearance (e.g., in the case of nuts and bolts) will determine the required film thickness for optimum bonding.

The two metal surfaces and the interposed adhesive composition are maintained in engagement until the said adhesive composition has cured sufficiently to bond the said surfaces. Cure advancement may be promoted by post-baking the bonded parts after an initial cure time at room temperature. The post-baking preferably takes place above about 150° C. and below about 190° C. Additionally, incorporation of glass beads to control bondline thickness is preferred especially in hemming operations, as is taught in U.S. Pat. Nos. 5,487,803 and 5,470,416.

Although the present invention has been described with reference to particular embodiments, it should be recognized that these embodiments are merely illustrative of the principles of the present invention. Those of ordinary skill in the art will appreciate that the compositions, apparatus and methods of the present invention may be constructed and implemented in other ways and embodiments. Accordingly, the description herein should not be read as limiting the present invention, as other embodiments also fall within the scope of the present invention as defined by the appended claims.

Method of Manufacturing the A Side Composition

1. Add the primary monomer to a vessel and heat while stirring to no more than 60° C.
2. Next, slowly add the maleimide terminated polyimide (MTP).
3. Maintain the temperature until there are no visible particles of MTP.
4. Continue heat and mixing for an additional hour to ensure complete extension of MTP molecule.
5. Allow the solution to cool to approximately 40° C., then add the remaining constituents.

Summary of MTP Prototype Formulations:

| System | MTP Resin | Rubber Adduct |
|---|---|---|
| P1 | 15.0% | 24.4% |
| P2 | 9.0% | 24.4% |
| P3 | 15.0% | 30.0% |

Formulations:

P1 A-side

| Component | Weight Percent |
|---|---|
| Acrylic Monomer | 43.51 |
| Adhesion Promoter | 1.05 |
| HEMA-phosphate | 3.43 |
| Std. GMA/CTB | 4.40 |
| Modified GMA/CTB | 20.00 |
| Chain extended MTP resin* | 15.00 |
| Diisopropyl-p-toluidine (DIIPT) | 1.10 |
| Phenolic Antioxidant | 0.009 |
| Methyl hydroquinone | 0.003 |
| Wollastonite | 10.00 |
| Silica | 1.500 |
| Total | 100.00 |

*The MTP resin employed in these examples is a bis-maleimide terminated polyimide hereinafter referred to as "MTP".

P2 A-side

| Component | Weight Percent |
|---|---|
| Acrylic Monomer | 47.51 |
| Adhesion Promoter | 1.05 |
| HEMA-phosphate | 3.43 |
| Std. GMA/CTB | 4.40 |
| Modified GMA/CTB | 20.00 |
| Chain Extended MTP resin | 9.00 |
| Diisopropyl-p-toluidine (DIIPT) | 1.10 |
| Phenolic Antioxidant | 0.009 |
| Methyl hydroquinone | 0.003 |
| Wollastonite | 10.000 |
| Silica | 1.500 |
| Total | 100.00 |

P3 A-side

| Component | Weight Percent |
|---|---|
| Acrylic Monomer | 37.91 |
| Adhesion Promoter | 1.05 |
| HEMA-phosphate | 3.43 |
| Modified GMA/CTB | 30.00 |
| Chain Extended MTP resin | 15.00 |
| Diisopropyl-p-toluidine (DIIPT) | 1.10 |
| Phenolic Antioxidant | 0.009 |
| Methyl hydroquinone | 0.003 |
| Wollastonite | 10.000 |
| Silica | 1.500 |
| Total | 100.00 |

B-side (P1, P2, and P3 Use the Same B-side)

| Component | Weight Percent |
|---|---|
| Liquid Epoxy Resin | 71.00 |
| 44% BPO powder in plasticizer | 27.00 |
| Silica | 2.00 |
| Total | 100.00 |

The composition is them mixed in a 10:1 A:B ratio and applied to substrates for testing. Both Impact Wedge Peel (IWP) and Lap Shear Strength (LSS) of the adhesive were tested as is known in the art. The key experimental results are listed below evidence the superior performance of MTP-modified acrylic formulations over commercially successful prior art systems.

Failure Modes are Described as Follows:

c—cohesive failure; bond cleavage takes place through adhesive bulk; a layer adhesive deposits on both substrates with even thickness tlc—thin layer cohesive failure; bond cleavage still takes place through adhesive bulk; a thinner layer of adhesive deposits on one substrate and a thicker layer on the other a—adhesive failure: bond cleavage takes place at interface of substrate and adhesive, leaving bare substrate on one or both substrates without adhesive deposit Approximately 100% cohesive failure (with small portion of thin layer cohesive failure) was achieved on both aluminum (6061 T6, 0.030", ACT) and electro-galvanized steel (EGS) (0.030", ACT).

| System | Metal | LSS$_{175C}$ | LSS$_{190C}$ |
|---|---|---|---|
| P2 | Al | 2947 ± 12 | 2885 ± 59 |
|  |  | 80c20tlc | 95c5a |
|  | EGS | 2337 ± 43 | 2254 ± 42 |
|  |  | 92c8tlc | 87c13tlc |
| P3 | Al | 2827 ± 54 | 2733 ± 42 |
|  |  | 100c | 96c4tlc |
|  | EGS | 2247 ± 35 | 2244 ± 37 |
|  |  | 96c4tlc | 96c4tlc |

Good adhesive improvement was reproduced by P3 and demonstrated also by P1.

| | | LSS (psi) | | IWP (N/mm) | |
|---|---|---|---|---|---|
| System | Composition | 175 C. | 190 C. | 175 C. | 190 C. |
| P1 | 15% MTP resin | 2361 ± 44 | 2274 ± 62 | 23.9 ± 1.3 | 22.9 ± 2.2 |
|  | 24.4% rubber adduct | 90c2tlc | 86c12tlc2a | 100c | 100tlc |
| P3 | 15% MTP resin | 2235 ± 70 | 2158 ± 51 | 29.5 ± 2.5 | 26.8 ± 1.5 |
|  | 30% rubber adduct | 100c | 100c | 100c | 100c |

*175 C./25 min. and 190 C./45 min. were postbake conditions.

Samples P1 and P3 were tested against a common commercially successful structural adhesive, Versilok® adhesive, available from LORD Corporation, Cary, N.C., USA, hereinafter "PA Adhesive"

| | Impact Wedge Peel (N/mm) | Lap Shear Strength on Clean Metal (psi) | Lap Shear Strength on Oily Metal (psi) |
|---|---|---|---|
| PA Adhesive | 18 | 1950 | 1850 |
| P1 | 29 | 2200 | 2150 |
| P3 | 32 | 2350 | 2200 |

1) The MTP-modified formulation demonstrated stronger lap shear strength at under bake (160° C./15 min.), normal bake (175° C./25 min.), and over-bake (190° C./45 min.) conditions; neither under or over-bake compromised performance, showing the robustness of the system.

Under and Over-Bake Lap Shear Strength (PSI) Performance Evaluation:

| | 160° C. | 175° C. | 190° C. |
|---|---|---|---|
| P1 | 2300 | 2250 | 2200 |
| P3 | 2250 | 2200 | 2250 |

Under and Over-Bake Impact Wedge Peel (N/mm) Performance Evaluation:

| | 160° C. | 175° C. | 190° C. |
|---|---|---|---|
| P1 | 26 | 29 | 21 |
| P3 | 29 | 32 | 19 |

2) MTP-modified formulation showed higher LS strength (psi) at low (−30° C.), ambient (22° C.), and high (80° C.) testing temperatures on electro-galvanized steel.

| | −30° C. | 22° C. | 80° C. |
|---|---|---|---|
| P1 | 2837 | 2208 | 1296 |
| P3 | 2835 | 2264 | 1227 |
| PA Adhesive | 2596 | 2089 | 895 |

3) The prototype also showed significantly higher T-peel strength (pli) and bonds well through oiled metals and works well on EGS/HDS cross-bonding.

| | 175° C. Bake | 190° C. Bake |
|---|---|---|
| PA Adhesive (oiled) | 37 | 32 |
| P1 (oiled) | 48 | 46 |
| P3 (oiled) | 48 | 45 |
| P3 (un-oiled) | 50 | 45 |

Both MTP containing formulations outperformed the prior art on both aluminum and electro-galvanized Steel
Lap Shear Strength (psi)

| | Aluminum | Electro-galvanized Steel |
|---|---|---|
| PA Adhesive | 2400 | 1900 |
| P2 | 2900 | 2400 |
| P3 | 2800 | 2300 |

4) Prototype consistently showed higher Impact Wedge Peel strength (toughness) than the PA Adhesive on oiled metal at 22° C. and 80° C. testing temperatures.

| | −30° C. | 22° C. | 80° C. |
|---|---|---|---|
| PA Adhesive | 1 | 18.8 | 20.3 |
| P2 (no oil) | 13.8 | 26.8 | 23.9 |
| P2 (oiled) | 5.8 | 27.9 | 22.9 |

What is claimed is:

1. A structural adhesive comprising:
    a free radical-polymerizeable monomer comprising tetrahydrofurfuryl methacrylate (THFMA); and,
    a maleimide terminated polyimide wherein the maleimide comprises a mono-, bis-, or poly-maleimide compound.
2. The composition of claim 1, further comprising a toughener.
3. The composition of claim 2, wherein the toughener comprises at least one of glycidyl methacrylate/carboxyl terminated butadiene (GMA/CTB) adducts, core-shell impact modifiers, or block copolymer elastomers.

4. The composition of claim 1, further comprising an adhesion promoter.

5. The composition of claim 4, wherein the adhesion promoter comprises hydroxyethyl methacrylate (HEMA) phosphate.

6. The composition of claim 1, further comprising a metal dimethacrylate.

7. The composition of claim 6, wherein the metal dimethacrylate comprises zinc dimethacrylate.

8. The composition of claim 1, further comprising ethoxylated bisphenol A dimethacrylate.

9. The composition of claim 1, further comprising a particulate additive comprising at least one of calcium metasilicate or fumed silica.

10. A two part structural adhesive composition comprising:
in part A: (a) at least one free radical-polymerizable monomer; (b) a maleimide terminated polyimide; and (c) a reducing agent; and
in part B: an oxidizing agent.

11. An adhesive according to claim 10, wherein the reducing agent comprises at least one of N,N-diisopropanol-p-chloroaniline; N,N-diisopropanol-p-bromoaniline; N,N-diisopropanol-p-bromo-m-methylaniline; N,N-dimethyl-p-chloroaniline; N,N-dimethyl-p-bromoaniline; N,N-diethyl-p-chloroaniline; N,N-diethyl-p-bromoaniline; N,N-dimethyl-p-aniline; or N,N-diisopropanol-p-toluidine.

12. The adhesive of claim 10, wherein the oxidizing agent comprises benzoylperoxide.

13. The adhesive composition of claim 10, wherein the weight ratio of the first package to the second package is from about 1:1 to about 15:1.

14. The adhesive composition of claim 10 wherein the free radical-polymerizeable monomer comprises tetrahydrofurfuryl methacrylate (THFMA).

15. The adhesive composition of claim 10, further comprising at least one of glycidyl methacrylate/carboxyl terminated butadiene (GMA/CTB) adducts, core-shell impact modifiers, or block copolymer elastomers.

16. The adhesive composition of claim 10, further comprising hydroxyethyl methacrylate (HEMA) phosphate.

17. The composition of claim 1, further comprising an oxidizing agent.

18. The composition of claim 17, wherein the oxidizing agent comprises benzoylperoxide.

19. The composition of claim 1, further comprising a reducing agent.

20. The composition of claim 19, wherein the reducing agent comprises at least one of N,N-diisopropanol-p-chloroaniline; N,N-diisopropanol-p-bromoaniline; N,N-diisopropanol-p-bromo-m-methylaniline; N,N-dimethyl-p-chloroaniline; N,N-dimethyl-p-bromoaniline; N,N-diethyl-p-chloroaniline; N,N-diethyl-p-bromoaniline; N,N-dimethyl-p-aniline; or N,N-diisopropanol-p-toluidine.

* * * * *